United States Patent [19]

Akey et al.

[11] 3,901,090

[45] Aug. 26, 1975

[54] METHOD AND APPARATUS FOR DETECTING MALASSEMBLED NUCLEAR FUEL RODS

[76] Inventors: John G. Akey, 630 Garden City Dr., Pittsburgh, Pa. 15146; William J. Wachter, 3157 Bel Air Dr., Pittsburgh, Pa. 15227

[22] Filed: Feb. 15, 1972

[21] Appl. No.: 226,483

[52] U.S. Cl. .............................. 73/67.2; 176/19 R
[51] Int. Cl. ............................................ G01h 13/00
[58] Field of Search ............ 73/67, 67.1, 67.2, 71.6; 176/19 R

[56] References Cited
UNITED STATES PATENTS

| | | | |
|---|---|---|---|
| 2,305,268 | 12/1942 | Minor et al. | 73/67.1 |
| 3,157,045 | 11/1964 | Maki | 73/71.6 |
| 3,226,975 | 1/1966 | Muller et al. | 73/67.2 |
| 3,240,674 | 3/1966 | Ledwidge | 176/19 R |

*Primary Examiner*—Jerry W. Myracle
*Assistant Examiner*—John P. Beauchamp
*Attorney, Agent, or Firm*—Brown, Murray, Flick & Peckham

[57] ABSTRACT

A fuel bundle having fuel rods supported by a plurality of grids with supporting fingers arranged at two axes of support is vibrated over a predetermined frequency range with in-phase and out-of-phase shakers while establishing signal representations of various rod resonant frequencies and magnitudes at particular frequency modes as well as bundle fundamental frequencies and harmonics thereof. A comparison of the rod resonant frequency responses along one of the axes as, for example, the X axis, provides a method of determining that a loose rod exists along a particular grid line. The characteristic detected, according to the invention, is the relatively low amplitude of the rod resonance response at that line of grid detection as compared to the response, along the same axis, of the responses detected along the same parallel axis of the two adjacent grids. The particular defective support location within the grid may then be determined by performing a similar test along the other axis, such as the Y axis, so that the intersection of the two points of abnormal vibration response will locate the defective point. In addition to providing an accurate and precise method of determining a loose rod, the invention also permits development of a total bundle "signature" characteristic which may be compared to the known "signature" of a good bundle to determine the adequacy of the total assembly. In the specific method of testing and defect location, provision is made to provide for seismic response testing along with those tests designed to locate a loose rod, or an abnormal bundle characteristic. In addition, provision is also made to detect the occurrence of "extra" frequencies as an added insurance that no defect or loose particles or pieces will go undetected and, further, to detect the occurrence of an impact (pinging) which may occur from a loose rod.

10 Claims, 8 Drawing Figures

METHOD AND APPARATUS FOR DETECTING MALASSEMBLED NUCLEAR FUEL RODS

BACKGROUND OF THE INVENTION

In the present state of the nuclear reactor art there exists no method for economically testing nuclear fuel rod assemblies to insure that they are mechanically acceptable for use in a nuclear reactor. Various methods have been considered but have been discarded because of the excessive cost involved. For example, some optical testing has been performed to a limited extent but since over 1500 examinations are required for each bundle, this approach has never been utilized to completely test the entire bundle.

As a result, there have been several occasions where, after the fuel rod assembly has been entered into the reactor vessel and has already become radioactive, there have been failures. When this happens, the plant must be shut down, the reactor must be opened with remote handling equipment, and the defective assembly or bundle must be removed.

The typical failure in the field has occurred because of the wear which occurs on the metal cladding of a particular fuel rod caused by the flow-induced vibration or pulsations from the pump. Over a period of time the vibration of a supporting finger against the metal cladding of the rod may cause a fissure in the rod with the result that there can be a radioactive leak which will contaminate the water and, further, radioactive gases may be produced.

Thus, even if it is possible to repair fuel rod assemblies after they have been introduced into the reactor, it is preferable to avoid such a failure because of the possibility of contaminating the environment. Accordingly, the present invention is particularly important for environmental protection.

SUMMARY OF THE INVENTION

Before summarizing the basic method of the invention, it is convenient to define the "bundle" structure as it relates to three axes X, Y and Z. It will be assumed that the Z axis runs along the length of the bundle which may be in the order of 10 to 12 feet and that it runs through the center of the bundle with all of the rods being substantially parallel to the Z axis. The X and Y axes then define a plane which is parallel to each of the parallel grids in which the rods are supported. Although the invention may be practiced by sensing only those vibrations excited through the various grids along lines parallel to the X axis, it is preferred to perform vibration sensing along all three axes to insure the highest possible reliability of the method of testing and defect locating.

Just as it is preferred to sense vibrations in all three directions of motion, it is also desirable to provide excitation vibration, by means of shakers or other suitable means, along all three axes. Considering the excitation vibration along the X axis, as an example, excitation is provided at the top and bottom of the bundle, suitably being applied to the top and bottom nozzles. A plurality of X-axis transducers (referenced as TDX1 ... TDXN herein) are selectively sampled by means of a central controller (which could be performed partially manually) over various frequency ranges defined herein as: (1) bundle and seismic frequency range, (2) rod resonance frequency range, and (3) extra frequency range. The bundle and seismic frequency range is expected to be in the order of 1 to 10 Hz. The rod resonant frequency range in the order of 10 to 120 Hz, and the extra frequency range from 120 to 1,000 Hz. The basic method of testing and defect detection will be summarized considering only the X axis method of operation. The upper and lower X shakers are caused to operate in phase starting with the lowest bundle frequency (in the order of 1 Hz) and two types of responses from the X transducers are sampled. The first response is referred to herein as the excitation frequency response which includes both the amplitude of the response at the excitation frequency and the phase thereof. The second response sampled, while maintaining the particular excitation frequency, is referred to as the amplitude response detected at frequencies other than the excitation frequency. While many variations on the basic theme of the invention are possible, it is preferred to complete all of the tests and various comparisons at each excitation frequency before continuing to the next series of tests. This makes it possible to detect a defective connection early. If, for example, substantial extra frequencies or an "impact" characteristic is detected during the testing at the lowest bundle frequency, the method of the invention contemplates immediately moving to the rod resonant frequency range to detect and locate the defective rod support. If no "extra" frequencies are detected within the bundle and seismic frequency range, the procedure continues with a shift in the shaker phase relationship by 180° and further with an amplitude control permitting testing of the seismic response of the bundle at the same time.

While various types of vibration testing have been performed in nonanalogous fields, the invention provides the first method suitable for nuclear fuel rod assemblies through the recognition of the particular response comparisons which are important and the manner in which they should be performed. It will be understood from the following that, while the invention may be practiced as a step-by-step procedure using test equipment as described herein, it may be preferred to completely automate the process through the use of a central controller which may be a programmed computer. The program for the computer will be obvious to those skilled in the art in considering the precise series of steps which are set forth in the specification hereinafter as they relate to how the equipment is to be run. The invention herein resides in the method of testing and detecting points of malassembly in a nuclear fuel bundle, not in any particular computer program for carrying out this method.

The above and other objects and features of the invention will become apparent from the following detailed description taken in connection with the accompanying drawings which form a part of this specification, and in which:

FIG. 1 is a schematic diagram of a system for testing nuclear fuel rod assemblies according to the invention;

FIG. 2 is a block diagram showing the interrelationship of the various components forming means 200 of FIG. 1 with transducer multiplexer 70 and central controller 100;

Figure 1:
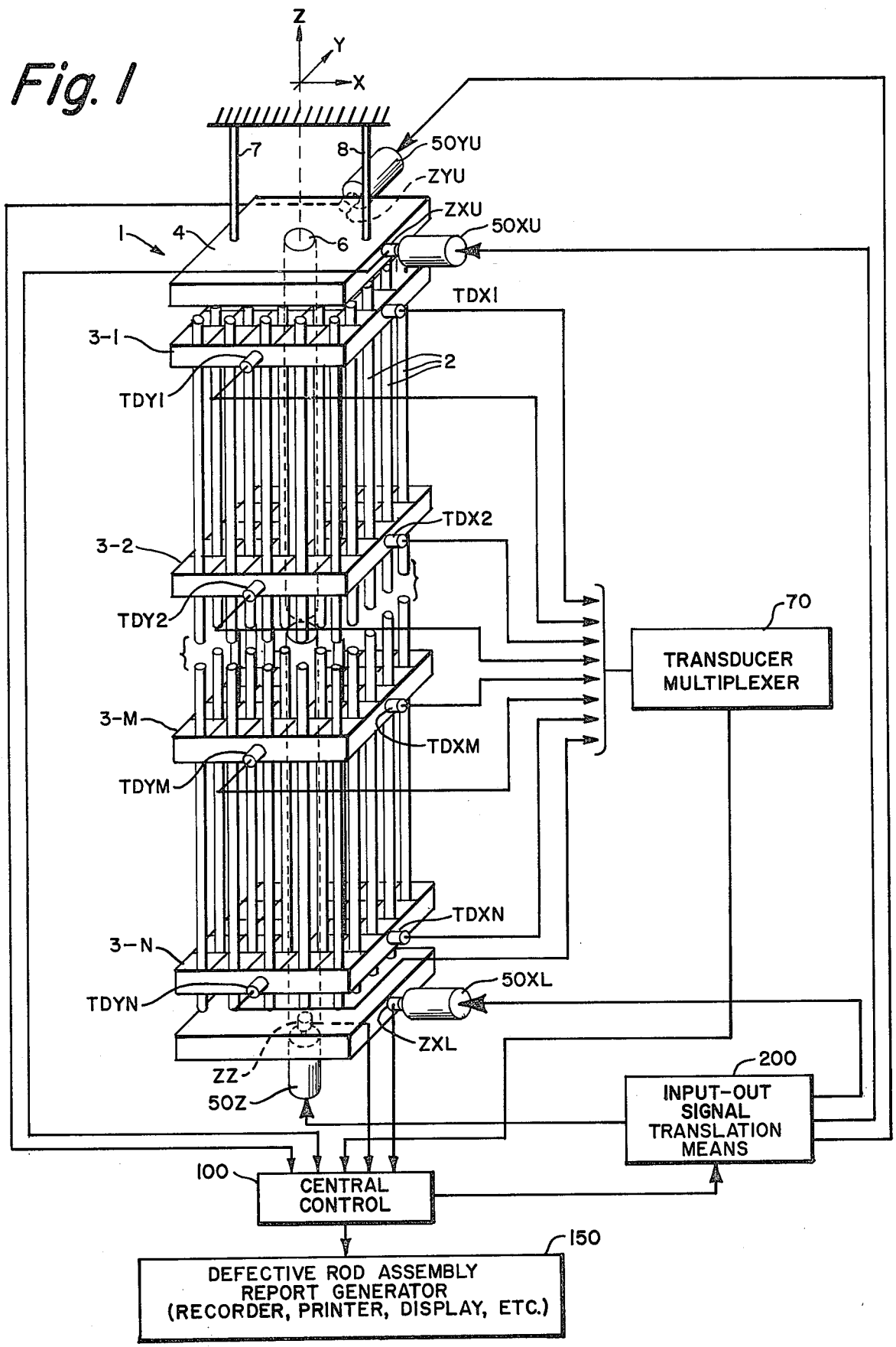

Reference is now made to FIG. 1 where a nuclear fuel rod assembly or bundle 1 is shown as comprising a plurality of rods 2 supported by a plurality of grids 3. At the top and bottom of the assembly are nozzles 4 and 5 connected by a suitable guide tube 6. During tests, according to the present invention, the assembly is supported for vibration by suitable elements 7 and 8 which may, typically, be nylon sheathed rubber core shock cord. The three axes X, Y and Z are shown to establish convenient vibrational axes for reference and it will be noted that vibration along the X axis is introduced by an upper vibrator or shaker 50XU imparting vibration to top nozzle 4 through a suitable impedance head ZXU which measures the amplitude and phase of the vibration and the applied force. Attached to the lower nozzle is a vibrator or shaker 50XL, the amplitude and phase of which are measured through impedance head ZXL. Corresponding shakers for the Y axis are 50YU and 50YL with impedance heads ZYU and ZYL. A shaker 50Z is shown for inducing vibrations along the Z axis and has an associated impedance head ZZ. The impedance heads supply signals to the control system representing the amplitude and phase of the exciting vibrations applied by the corresponding shakers.

A plurality of vibration sensing transducers which may, typically, be accelerometers or microphones or other means for translating vibration into signals representative thereof, are placed in contact or near contact at points along each grid to measure the X and Y vibrations. Similar transducers or other vibration sensing detectors may also be placed in contact with each rod, if desired, to enable individual analysis of the frequency response of each rod. Thus, transducers TDX1, TDX2, TDXM and TDXN are arranged to sense X axis vibrations in relationship to grids which may be referenced as 3-1, 3-2, 3-M and 3-N. In a similar manner, a series of transducers TDY1 through TDYN are provided to sense the Y axis vibrations at the corresponding grids. It will be understood that the number of grids will vary depending upon the particular bundle configuration and the spacing between grids will vary as well as the number of grid openings for rods. To simplify the explanation of the invention, it will be assumed that a small bundle is analyzed which is configured to provide a 5 × 5 grid for 24 fuel rods (plus one guide tube) and that four or five grids are present. In an actual assembly, however, there may be a grid with 25 × 25 openings for rods and several guide tubes. In such an assembly, the total length may be in the order of 10 to 12 feet with seven grids spaced in the order of 20 inches apart. It will be understood, of course, that the principles taught herein with respect to defect and particle detection and location do not depend upon the particular configuration of the assembly tested.

Figure 2:
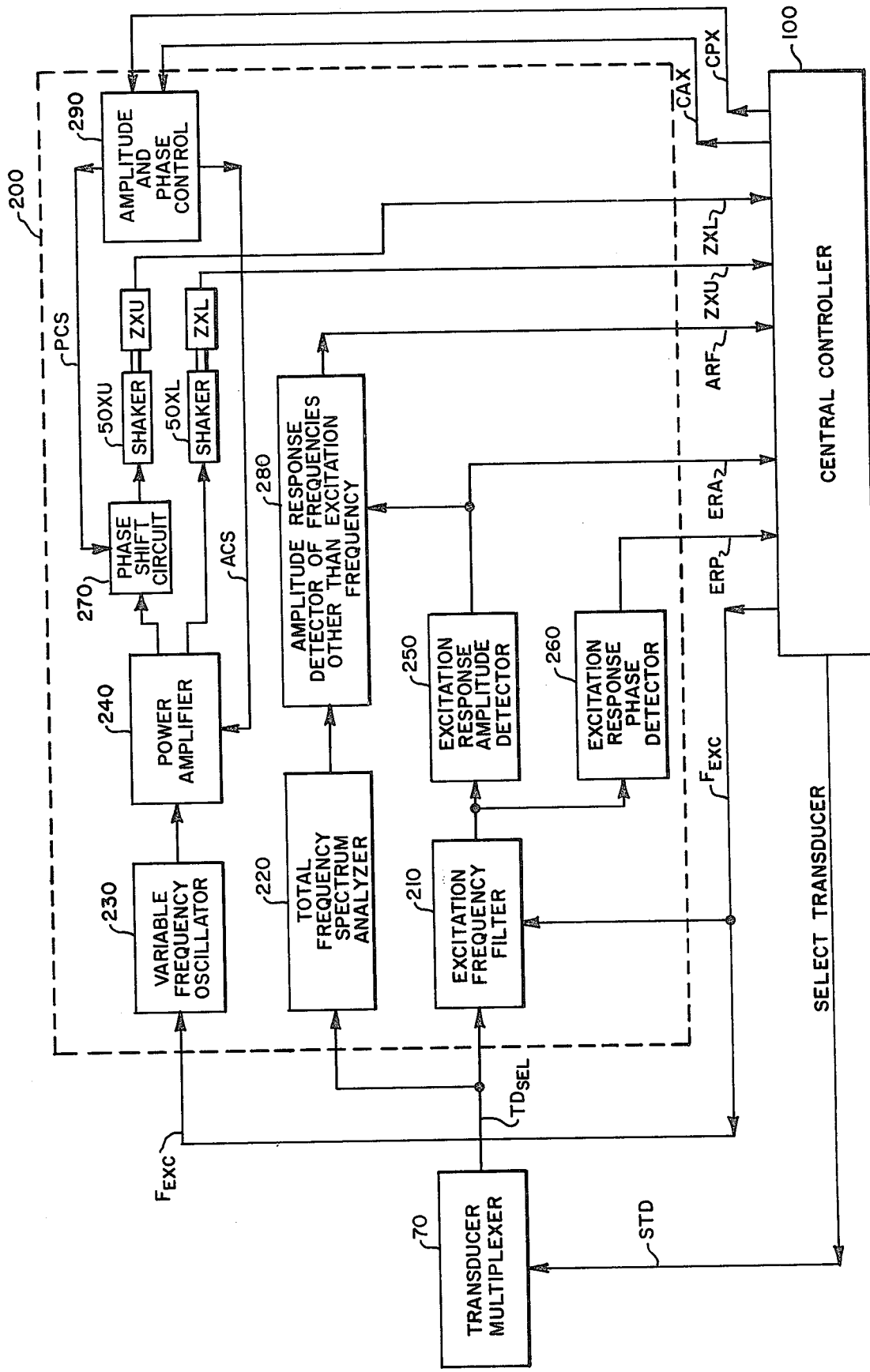

The output signals produced by transducers TDX are shown as being applied to a transducer multiplexer 70. It will be understood that the signals of all of the transducers are applied in a similar manner to the multiplexer for appropriate selection under the control of a central controller 100. The representation of a central controller is intended to be generic to many types of utilization of the invention. Controller 100 may constitute an operator's control panel where certain of the controls are automatic upon operator initiation and others are manually performed step-by-step. Controller 100 is shown as being coupled to means 150 entitled "Defective Rod Assembly Report Generator" (recorder, printer, display, etc.). Means 150 may, in the simplest case, comprise a level recorder which makes a record of the results of the various operations which are performed according to the method of the invention. Basically, the method of the invention does not require that there be complete automation. However, due to the complexity of the testing procedure of the invention, automation is preferred wherever possible in order to insure the reliability of the results. The entire means described in detail in FIG. 2 is summarized in FIG. 1 as means 200 being characterized as: Input-Output Signal Translation Means.

Reference is now made to FIG. 2 where the various components of means 200 are shown with reference to how they interact with each other and with the input signals provided by multiplexer 70 and the various control signals provided by central controller 100. Central controller 100 provides a select transducer control signal STD which may, in the case of a digital computer, constitute a transducer select address in digital code. In the case where controller 100 is an operator's panel, its signal STD may be obtained through a rotary switch or other suitable means. The output signal produced by multiplexer 70 is referenced as TDsel and is applied to two components referred to as excitation frequency filter 210 and total frequency spectrum analyzer 220. Filter 210 also receives a control signal from the central controller representing the particular excitation frequency Fexc then in effect. This frequency signal is also applied to the oscillator 230 which controls the frequency of the shakers 50XU and 50XL. Control signals CAX and CPX are applied to amplitude and phase control device 290. Signal CAX defines the amplitude of the vibration, where signal CPX defines the phase relationship between two shakers along the same axis, illustrated to be shakers 50XU and 50XL in FIG. 2. The controller 290, in turn, controls the power amplifier 240 and the phase shift circuit 270 to determine the amplitude and phase of the exciting vibration applied by the shakers. It will be understood that a similar control is provided for the Y-axis and that a control is also provided for the Z-axis vibration where this is appropriate.

Filter 210 is a well-known component which produces an output signal representing the frequency component of the sensed waveform in TDsel corresponding to the excitation frequency Fexc. In a typical case, the filter comprises a plurality of discrete filters which are selected to correspond to the excitation frequency so that filter 210 may be assumed to include the appropriate switching for selecting that frequency. Spectrum analyzer 220, on the other hand, is sometimes referred to as a real time analyzer and is designed to reproduce a representation of all of the frequencies during a period of time corresponding to one sampling interval. The sampling interval of analyzer 220 will, normally, correspond to the period of the frequency of excitation. Thus, if Fexc is at 30 Hz, then analyzer 220 will have a sample period in the order of one-thirtieth of a second. The output signal from filter 210 is applied to an excitation response amplitude detector 250 and also to an excitation response phase detector 260. Both of these detectors are conventional components available in the art. Detector 250 produces a signal ERA representing the amplitude of the response at the excitation frequency and detector 260 produces a signal ERP representing the phase of the response as it is referenced to the phase of the excitation signal CAX applied to amplitude phase control 290. The output of the spectrum analyzer 220 is applied to an amplitude response detector for frequencies other than the excitation frequency, being referenced as component 280. Signal ERA is shown as being applied to detector 280 so that this component may be removed from the output of detector 280 or this may be accomplished by including, in signal ARF of detector 280, all of the frequencies and then subtracting the ERA component from the ARF component in central controller 100. The important function of detector 280, however, is to provide a response indicating the "extra" frequencies. Control device 290 provides an amplitude control signal ACS for power amplifiers 240 and a phase shift circuit 270 which receives the output signal from one of the power amplifiers in means 240. Only a single phase shift circuit is required since it is only necessary to shift the phase of one shaker with respect to the other. As previously noted, the amplitude and phase of shakers 50XU and 50XL are represented by the output signals produced by impedance heads ZXU and ZXL, respectively, and these signals are applied to controller 100.

To summarize, FIG. 2 shows an illustrative logic diagram representing a typical control system which can be used to carry out the method of the present invention, and indicating the manner in which it can be programmed as outlined above. That is, the central controller 100 provides signals in a preset sequence to the oscillator 230 and the controller 290 to set the frequency, amplitude and phase of the exciting vibration applied by the shakers, the impedance heads feeding corresponding signals back to the controller for regulation purposes. The sensing transducers pick up the induced vibrations at their respective locations and their signals are fed through the multiplexer 70 to the filter 210 and the analyzer 220. These devices perform the analysis of the received vibration and the results are supplied through the controller 100 to the readout or reporting system 150. It will be understood, of course, that this control system is only illustrative and that the required operation may be carried out and controlled by any desired means.

Figure 3A:
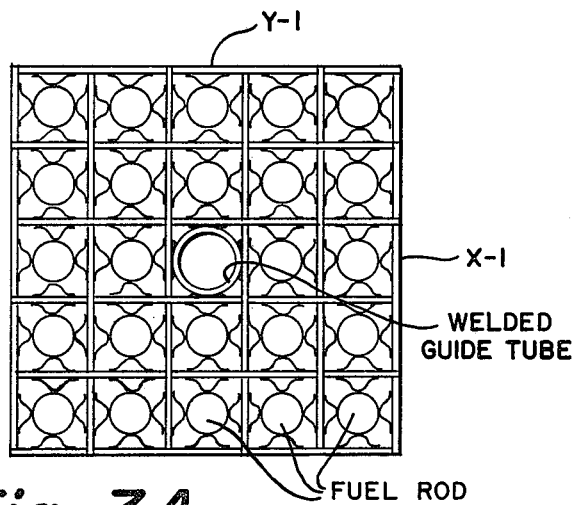
FIGS. 3A and 3B show the structure of a typical grid to indicate the manner in which the fuel rods are supported therein.
Figure 3B:
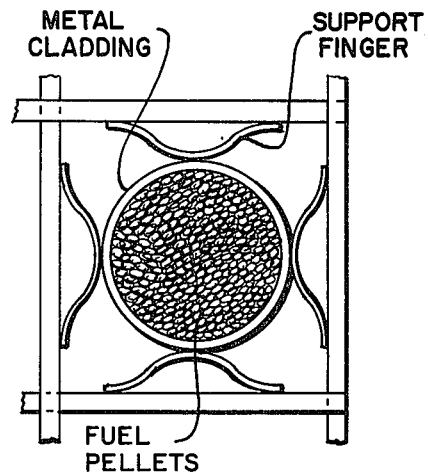

Referring now to FIG. 3A, it will be noted that a typical top view of a 5 × 5 grid is shown. Typically, each rod is supported in its particular grid location by means of four support fingers shown in an expanded view in FIG. 3B. The fingers press against the metal cladding of a rod as shown in FIG. 3B within which are contained the fuel pellets. It is the vibration of the metal cladding against a support finger which may cause wear and result in a fissure in the rod. As noted in FIG. 3A at least one guide tube is welded, in the illustrative case of FIG. 3A, to the center of the grid. In the case of a 25 × 25 grid, there are a plurality of such guide tubes welded to appropriate grid locations. The particular grid of FIG. 3A is assumed to represent grid 3-1, and the projections on the Y- and X-axes are represented as Y-1 and X-1 to indicate the fact that vibrations along the X- and Y-axes are measured by suitable transducer means TDX1 and TDY1.

Figures 4A, 4B:
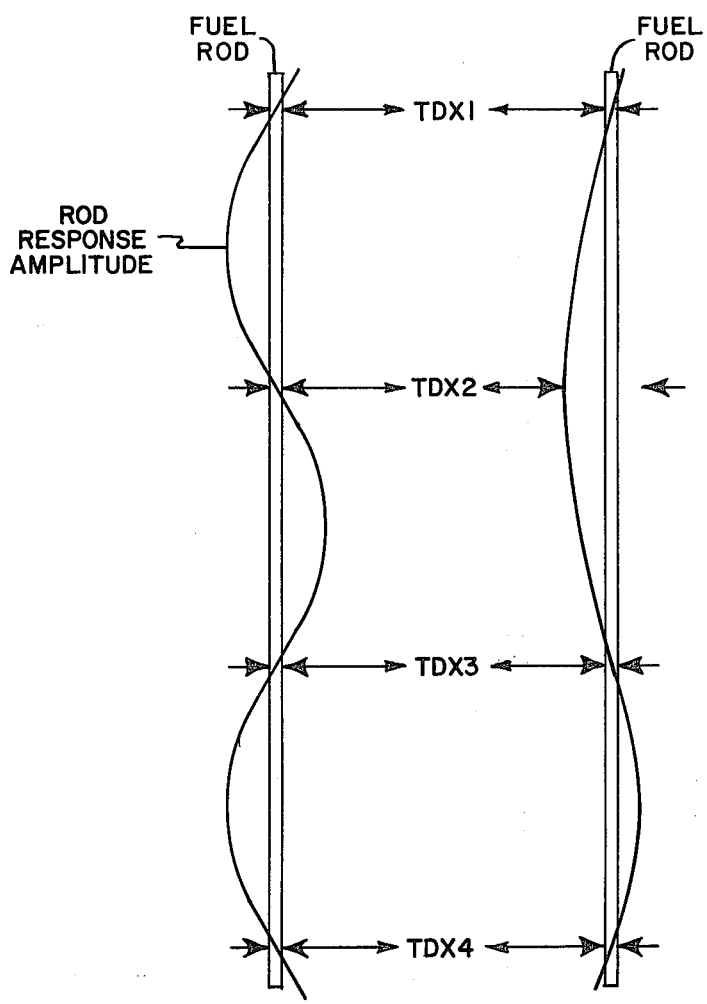
FIGS. 4A and 4B illustrate the change in the rod resonance response of a typical rod when there is a loose connection at one point.

In FIGS. 4A and 4B, the difference in rod resonant modes which occurs when there is a loose connection at a point along X-2 is illustrated. In FIG. 4A, the connection is normal and the rod resonant amplitude appears to oscillate symmetrically through the various points of support. In FIG. 4B, however, the loose connection along projection axis X-2 causes a different mode of vibration. Although the amplitude of the rod vibration at the particular point illustrated appears to be greater in FIG. 4B than in FIG. 4A at the point of the loose contact, actually the transducer senses a lower amplitude signal because contact is not made with the support finger to cause transmission of the vibration to the transducer. Thus, it will be seen that there will be a decrease in the amplitude along that sensing line where there is a loose connection and further that "extra" frequencies will be noted during the method of analysis according to the invention, that is, since the rod with the bad connection has different modes of vibration than the good rods, different resonant frequencies will occur which do not appear in the good rods.

Figure 5A:
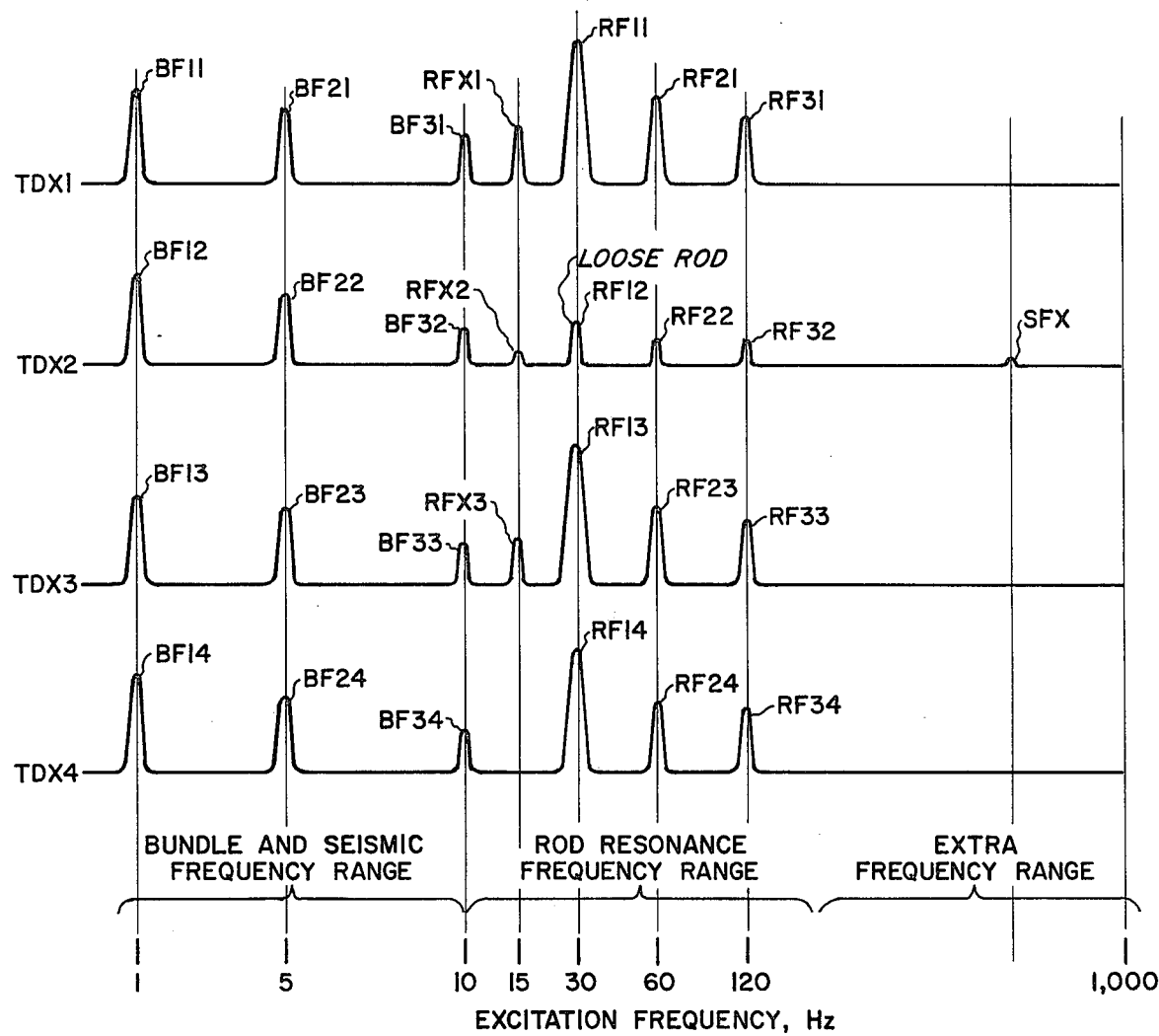
FIGS. 5A and 5B are composite response curves for frequency and time utilized to explain a typical method of operation with respect to X-axis analysis only.

In FIG. 5A a composite set of transducer response representations is presented to illustrate what might be expected to occur where transducer TDX2 receives a different response than the other transducers. According to the basic method of the invention, the excitation frequency is initiated at a very low frequency somewhat below 1 Hz in order to detect the response as the excitation frequency varies through perhaps 0.5 Hz to 2 Hz. The responses are referred to as bundle frequency responses and referenced BF11 through BF14 and are noted to be comparable in amplitude since these responses relate to the total bundle response and are not expected to significantly show any change due to a single or a few loose rods. However, this test is significant since the amplitude of the excitation signal applied to the shakers is made large enough to simulate a seismic impulse throughout the range of 0 to 10 Hz in order to detect an abnormal response of the total bundle. This abnormality can be detected by comparing the bundle response for a particular configuration to the expected bundle response from previous tests. As the excitation frequency is increased, harmonics of the bundle response will be detected with somewhat lower amplitudes. In the example of FIG. 5A, no "extra" frequencies are shown in the 0 to 10 Hz range since the representation of this figure is only that response which occurs at the various excitation frequencies shown. However, it may occur that there will be an unusual excitation frequency response at a point other than the particular bundle frequency shown and, in this case, such a response represents a total configuration "abnormality" which should be reported to the manufacturer.

After completion of the bundle and seismic frequency range excitation step, the method of the invention then proceeds into the rod resonant frequency range which is assumed as an illustration, to extend from 10 Hz through 120 Hz. It is in this range that one or more loose rod resonant characteristics will become apparent. Firstly, it will be noted that the rod frequency response RF12 at 30 Hz is shown as being significantly lower than the responses RF11 and RF13 which are adjacent to it in the upper and lower transducing planes. Thus, it is the decrease in amplitude of the received signal, as compared to adjacent planes, which indicates the bad connection. In addition, "extra" frequency responses such as RFX1, RFX2 and RFX3 may be expected because of the different mode of vibration of the badly connected rod. The extra frequency response at 15 Hz, for example, illustrates this possibility. The relative change in amplitude of the response along a particular transducing line is function of the number of rods which are supported along that line and therefore will be more clearly evident in smaller bundles such as 5 × 5 than in the larger bundles such as 15 × 15. The analysis may be extended to the individual rods by obtaining the frequency response of each rod by means of vibration sensing detectors placed in contact with each rod, as previously mentioned. The frequency response of each rod can then be analyzed by comparison with other rods and with previously determined frequency responses.

After completing the rod resonant frequency range, a frequency "sweep" is made in what is referred to as the extra frequency range to detect any unusual resonant frequencies beyond 120 Hz. This is carried up to a high frequency such as 1,000 Hz although even higher frequencies may be analyzed to detect, for example, resonance of the finger which is loose itself, of loose particles inadvertently left in the bundle, or of split rods.

Figure 5B:
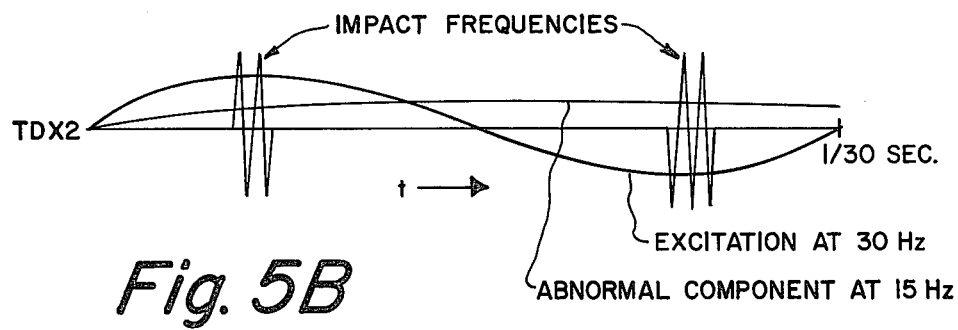

In FIG. 5B, the real time response along the line affecting transducer TDX2 is shown where the possibility of "impact" frequencies occurring is shown as well as the appearance of a number of waveforms other than the excitation frequency assumed to be 30 Hz. It may be expected, for example, to detect the abnormal component at 15 Hz.

The method of operating the invention in order to detect defects in the bundle assembly will now be summarized with respect to the procedure of analysis of vibrations along the X-axis. It will be understood, of course, that it may be desirable to perform the same analysis along the Y-axis and then, further, to complete the system analysis by vibration analysis along the Z-axis with a final analysis being made to precisely locate the defective connection or connections. In the method of operation which is summarized in the following, each step relates to what is done at each of a plurality of excitation frequencies which are defined as falling in certain ranges. Thus, the complete analysis of all of the transduced signals for both in-phase and out-of-phase vibration is completed for each excitation frequency before the system proceeds to the next frequency for analysis. Two basic methods of frequency variation may be employed. The frequency of vibration or excitation frequency may be continuously varied at a very slow rate by analog means over a period in the order of 5 to 10 minutes with the analysis being performed at relatively high speed with a special purpose or programmed computer. This has the effect of establishing discrete points of analysis along the excitation frequency range. The other approach is to utilize the computer means to establish the discrete excitation frequencies and to automatically move the frequency in steps to obtain a precise representation of the response. The frequency may be swept manually, also. The computer control technique may provide better results where the various bundle and rod resonant frequencies are not accurately known. The procedure in this case could be to approximate the expected resonant frequency and then to vary the excitation frequency in very small steps until the precise resonant frequencies are found. With the computer procedure, then, it would not be necessary to sweep the entire frequency range as a continuous operation but rather to inspect certain high probability resonant points very thoroughly.

SUMMARY OF METHOD OF THE INVENTION

I. Vibrate bundle along the X-axis with ZXU and ZXL in phase in "coarse" steps through the frequency range 1 to 120 Hz. (1) Compare bundle responses measured by X transducers to known characteristics for seismic amplitudes in the range of 1 to 10 Hz. (2) Compare excitation responses in amplitudes and phase with each other to detect differences in adjacent transducer planes. (3) Detect amplitude responses for frequencies other than the excitation frequency as a representation of "extra" frequency characteristics of a loose rod. (4) Detect "impact" or "pinging" frequencies detected through the total frequency spectrum analyzer.

II. If no "extra" frequencies or significant differences in amplitude or phase are detected in any of steps (1)–(4), repeat the process with ZXU and ZXL 180° out of phase.

III. If "extra" frequencies are detected or significant differences in amplitude or phase are noted between adjacent transducers in performing any of the particular excitation frequency steps (1)–(4) either with in-phase or out-of-phase excitation, repeat steps (1)–(4) with "fine" steps varying excitation frequency about the particular excitation frequency in increments in the order of 1% changes.

IV. If no detection of any "malassembly" at any of the X-axis test are detected, repeat in coarse steps for the Y-axis or in the case of the detection along the X-axis use the Y-axis test to locate a particular defective rod connection.

We claim as our invention:

1. The method of detecting loose, malpositioned or broken fuel rods or loose particles in a nuclear fuel assembly comprising the steps: vibrating the assembly in phase with a constant input over a frequency range in the order of 1 to 120 Hz to cover the lowest bundle frequency of the assembly to the highest first mode frequency of a single rod correctly supported; detecting the amplitude and phase response along an axis of each of the grids of the assembly; performing a total frequency spectrum analysis of the signal response at each grid axis; comparing the amplitude and phase responses of adjacent grid vibrations along an axis to detect unusual differences characteristic of a loose rod; detecting in said total frequency spectrum analysis the presence of frequencies other than the excitation frequencies including frequencies characteristic of "impacts" or "pinging" due to rods impacting against fingers or of loose particles; and repeating all of the above steps with the excitation being applied out of phase.

2. The method of claim 1 wherein the steps are first performed throughout a frequency range of 1 to 120 Hz in coarse steps to first determine whether any "extra" frequencies are present or unusual amplitude variations among the vibration sensed along different grid axes and then is repeated in fine steps to precisely determine which grid plane contains a malassembled fuel rod or loose particle.

3. The method of claim 2 wherein all of the steps are performed with respect to X- and Y-axes of the nuclear assembly to provide a representation of the grid coordinates where a defective assembly is present.

4. A method of detecting malassembled or defective nuclear fuel rod assemblies comprising the steps of applying vibrations to an assembly to be tested at two spaced locations, said vibrations being in phase and having constant input and the same frequency, varying said frequency over a range extending at least from the lowest resonant frequency of the complete assembly to the highest resonant frequency of a single fuel rod correctly supported, detecting vibrations in said assembly at predetermined positions between said spaced locations, and analyzing the frequency responses at each of said positions by comparison with the frequency responses at adjacent positions and with known frequency responses of good assemblies.

5. The method of claim 4 in which vibrations are detected on two mutually perpendicular axes in each of said positions.

6. The method of claim 4 including the further steps of applying vibrations 180° out of phase at said spaced locations, and repeating the previously defined procedure.

7. The method of claim 4 wherein a sensing detector is placed in contact with each rod in the nuclear fuel assembly, thus obtaining a representative frequency response from each rod, and electrically analyzing the representative frequency response from each of said rods.

8. A system for detecting malassembled or defective nuclear fuel rod assemblies consisting of a bundle of fuel rods supported in a series of spaced, parallel grids, said system comprising vibrator means for applying exciting vibrations to a fuel rod assembly at spaced locations adjacent opposite ends of the assembly, means for detecting vibrations in the assembly on the plane of each of said grids, means for controlling said vibrator means to apply vibrations in predetermined phase relation and at the same frequency in said spaced locations, means for varying said frequency over a predetermined range, means responsive to said vibration detecting means for determining the frequency response of the assembly at each of said planes throughout said range of frequencies, and means for analyzing the frequency responses at each plane by comparison with the frequency responses at adjacent planes and with known frequency responses of good assemblies.

9. The system of claim 8 in which the means for analyzing frequency responses includes means for detecting the amplitude of vibration in said planes.

10. The system of claim 8 in which the vibration detecting means includes transducers applied to each of said grids on mutually perpendicular axes.

* * * * *